United States Patent
Thong et al.

(10) Patent No.: US 8,234,277 B2
(45) Date of Patent: Jul. 31, 2012

(54) IMAGE-BASED RETRIEVAL FOR HIGH QUALITY VISUAL OR ACOUSTIC RENDERING

(75) Inventors: Jm Van Thong, Arlington, MA (US); Rahul Sukthankar, Pittsburgh, PA (US)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 11/647,567

(22) Filed: Dec. 29, 2006

(65) Prior Publication Data
US 2008/0162474 A1 Jul. 3, 2008

(51) Int. Cl.
G06F 7/00 (2006.01)
G06F 17/30 (2006.01)
(52) U.S. Cl. ........ 707/736; 707/758; 707/913; 707/917; 382/181; 382/276
(58) Field of Classification Search ................ 705/1, 10; 707/5, 6, 736, 758; 345/166, 173, 14.09, 345/156, E7.083; 348/14.09; 715/238, 209, 715/205, 239; 382/305, 218, 181, 276; 455/414.1; 358/1.16; 399/84
See application file for complete search history.

(56) References Cited

U.S. PATENT DOCUMENTS

| | | | | |
|---|---|---|---|---|
| 5,339,169 | A * | 8/1994 | Meguro et al. ................. | 358/403 |
| 6,182,090 | B1 * | 1/2001 | Peairs ........................... | 715/209 |
| 7,027,652 | B1 * | 4/2006 | I'Anson ........................ | 382/218 |
| 7,756,871 | B2 * | 7/2010 | Yacoub et al. ................. | 707/736 |
| 7,899,249 | B2 * | 3/2011 | Furmaniak et al. ............ | 382/176 |
| 2001/0053252 | A1 * | 12/2001 | Creque ........................... | 382/305 |
| 2004/0205462 | A1 * | 10/2004 | Levine .......................... | 715/500 |
| 2005/0169558 | A1 * | 8/2005 | Dance et al. .................. | 382/305 |
| 2006/0020486 | A1 * | 1/2006 | Kurzweil et al. ................ | 705/1 |
| 2006/0041828 | A1 * | 2/2006 | King et al. .................... | 715/500 |
| 2006/0098899 | A1 * | 5/2006 | King et al. .................... | 382/305 |
| 2006/0133845 | A1 * | 6/2006 | Savitzky et al. ................ | 399/84 |
| 2006/0294094 | A1 * | 12/2006 | King et al. ....................... | 707/6 |
| 2007/0015494 | A1 * | 1/2007 | Sinclair et al. ............. | 455/414.1 |
| 2007/0078846 | A1 * | 4/2007 | Gulli et al. ........................ | 707/5 |
| 2007/0288438 | A1 * | 12/2007 | Epstein ............................. | 707/3 |
| 2008/0042970 | A1 * | 2/2008 | Liang et al. .................. | 345/156 |
| 2008/0088698 | A1 * | 4/2008 | Patel et al. .................. | 348/14.09 |
| 2008/0141117 | A1 * | 6/2008 | King et al. .................... | 715/238 |
| 2008/0144102 | A1 * | 6/2008 | Curry ............................ | 358/1.16 |
| 2008/0174566 | A1 * | 7/2008 | Zuniga Zabala et al. ..... | 345/173 |

OTHER PUBLICATIONS

"Efficient Near-Duplicate Detection and sub-image retrieval"; Yan Ke; Rahul Sukthankar; and Larry Huston; Intel Corporation 2004; PA; USA.*

Yan Ke, Rahul Sukthankar, Larry Huston; "Efficient Near-duplicate Detection and Sub-image Retrieval"; Copyright Intel Corporation 2004.*

* cited by examiner

*Primary Examiner* — Giovanna Colan
(74) *Attorney, Agent, or Firm* — Pillsbury Winthrop Shaw Pittman LLP

(57) ABSTRACT

The embodiments of the invention relate to method for image-based retrieval of an image or text, comprising capturing a digital image; matching the digital image against digitally-stored documents; and retrieving one or more of the digitally-stored documents that match the digital image. Other embodiments relate to a device for image-based retrieval and rendering, comprising an image capturing device for capturing digital image; a device for processing the digital image to match it against digitally-stored documents; a device for retrieving a digitally-stored document that matches the digital image; and a device for rendering the selected retrieved image.

24 Claims, 3 Drawing Sheets

PUBLISHER REPRESENTATION OF A MAGAZINE PAGE:
(a) IMAGE OF A PAGE, (b) THE SAME PAGE LAYOUT, (c) ARTICLE TEXT, HERE, AN EXCERPT OF AN ARTICLE OF THE PAGE.

(a) ORIGINAL IMAGE     (b) ROTATED, SCALED, AND SHEARED

IMAGE-BASED RETRIEVAL FOR HIGH QUALITY VISUAL OR ACOUSTIC RENDERING

FIELD OF INVENTION

The embodiments of the invention relate to a reading machine for visually impaired or dyslexic individuals. The embodiments of the invention also relate to retrieving and rendering original images following capture of a query (digital) image.

BACKGROUND

People with disabilities, such as impaired vision or dyslexia, may have difficulty reading printed material. Automatic systems are needed to either display the documents with higher resolution or to render them as audio recordings.

It is known to provide a mobile print digitizer for the visually impaired. One known device captures printed documents and reads them to the user. A camera or scanner captures an image of a printed page, and then runs optical character recognition (OCR) on the image. A recognized problem with known reading machines is that a noisy image and/or a complex document layout may cause OCR recognition errors. The output is fed to a speech synthesizer such as a text-to-speech system (TTS).

Speech synthesis is the artificial production of human speech. A computer system used for this purpose is commonly called a speech synthesizer, and can be implemented in software or hardware. A text-to-speech system is a type of speech synthesizer that converts normal language text into speech; other systems render symbolic linguistic representations like phonetic transcriptions into speech.

Synthesized speech can be created by concatenating pieces of recorded speech that are stored in a database. Systems differ in the size of the stored speech units; a system that stores phones or diphones provides the largest output range, but may lack clarity. For specific usage domains, the storage of entire words or sentences allows for high-quality output. Alternatively, a synthesizer can incorporate a model of the vocal tract and other human voice characteristics to create a completely "synthetic" voice output.

The problem with known devices is that a "noisy" image and complexity of the document layout may cause recognition errors. For instance, a magazine may have several blocks of text, text over photos, articles spanning several pages, etc. Moreover it is possible that multiple users will want to read the same content, and re-scan documents that have already been processed.

Presently, the majority of printed material found in kiosks or libraries already exists in a digital form, as both text and high-resolution images. Known publishing processes begin with text, to which a layout is added. A high-resolution of the formatted text is created and then printed on paper. Most publishers have databases including the text, layout, and the high resolution image. Even when the only available version of an article or publication is a paper copy, the associated text, layout, and high resolution image can be generated by the publisher or another party and stored in a database. Text can be rendered as needed, such as being translated into audio using either a TTS system or having someone read it. Retrieving the text or the high resolution image, as needed, would provide a simplified and more accurate method of rendering the desired information.

DETAILED DESCRIPTION

Figure 1:
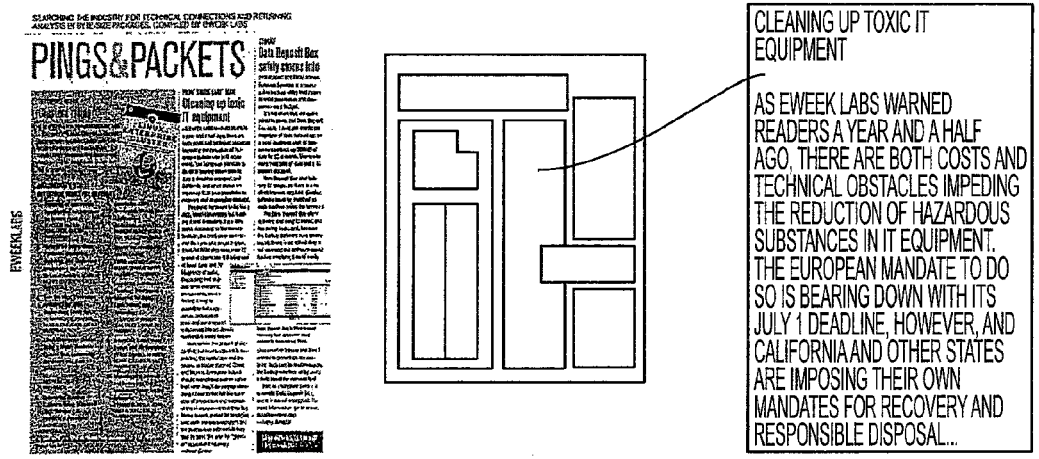
FIG. 1 is a flow chart illustrating the process of the invention.
Figure 1:
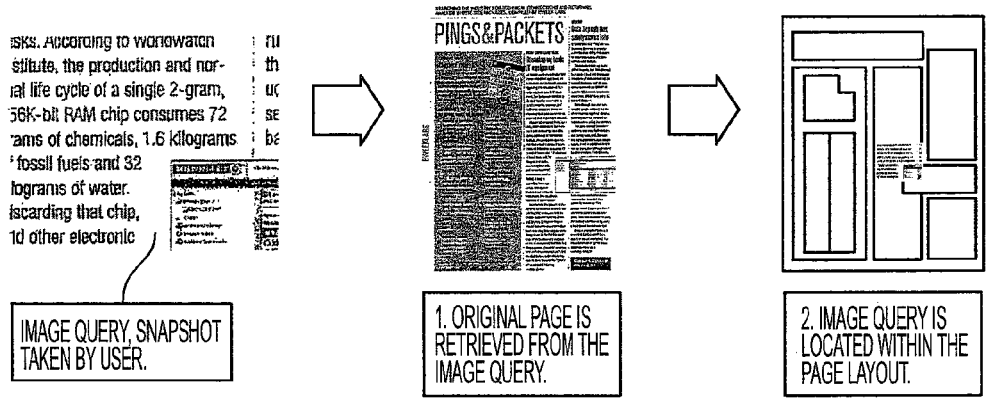
Figure 1:
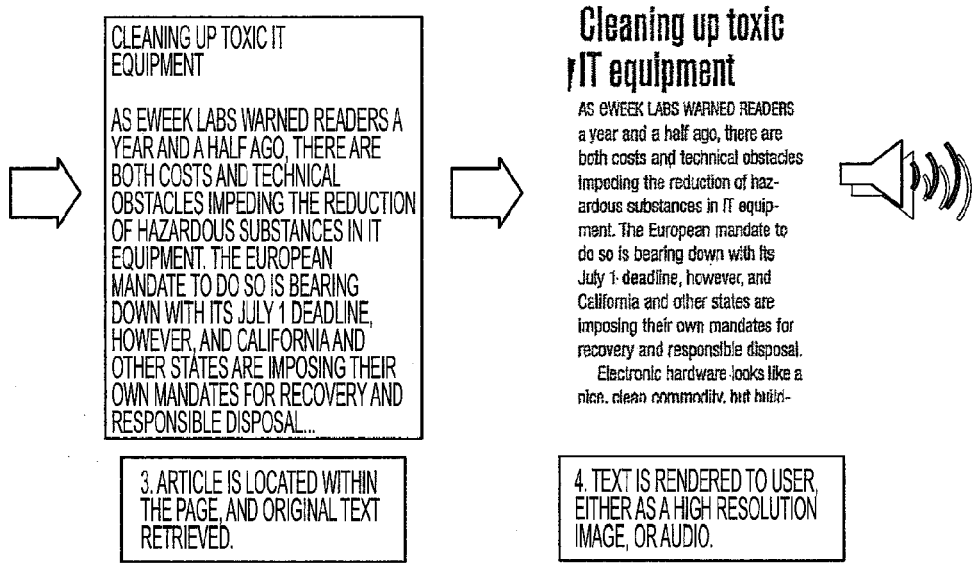

As used in the specification and claims, the singular forms "a", "an" and "the" include plural references unless the context clearly dictates otherwise. For example, the term "an array" may include a plurality of arrays unless the context clearly dictates otherwise.

The embodiments of the invention relate to a method for image-based retrieval of an image or text, comprising capturing a digital image; matching the digital image against digitally-stored documents; and retrieving one or more of the digitally-stored documents that match the digital image. Preferably, rendering includes converting the retrieved image for visual display. Preferably, rendering includes converting the retrieved image for audio output. Preferably, converting the retrieved image for audio output includes converting the image to text and converting the text to speech. Preferably, rendering includes converting the retrieved image for Braille output. Preferably, converting the retrieved image for Braille output includes converting the image to text. Preferably, the digital image is captured using a digital camera or a scanner.

Other embodiments of the invention relate to a method for image-based retrieval and rendering, the method comprising capturing a digital image; matching the digital image against digitally-stored documents; retrieving a digitally-stored document that matches the digital image; and rendering the retrieved image.

Yet other embodiments of the invention relates to a device for image-based retrieval and rendering, comprising an image capturing device for capturing digital image; a device for processing the digital image to match it against digitally-stored documents; a device for retrieving a digitally-stored document that matches the digital image; and a device for rendering the selected retrieved image. Preferably, the image capturing device includes a digital camera or a scanner. Preferably, the device for outputting the rendering of the image includes one or more of a computer monitor, a personal digital assistant, a cell phone, a television, a stereo, and dedicated equipment.

A text-to-speech system (or "engine") is an exemplary rendering option for the present invention that is composed of two parts: a front end and a back end. The front end has two major tasks. First, it converts raw text containing symbols like numbers and abbreviations into the equivalent of written-out words. This process is often called text normalization, pre-processing, or tokenization. The front end then assigns phonetic transcriptions to each word, and divides and marks the text into prosodic units such as phrases, clauses, and sentences. The process of assigning phonetic transcriptions to words is called text-to-phoneme or grapheme-to-phoneme conversion.

Phonetic transcriptions and prosody information together make up the symbolic linguistic representation that is output by the front end. The back end—often referred to as the synthesizer—then converts the symbolic linguistic representation into sound.

An embodiment of the retrieval process of the present invention is most simply defined as collecting a digital image of desired published text, using an image-matching technique to search for the matching image, and retrieving a high resolution image or text corresponding to the matching image. The retrieved high resolution image may be rendered and output in a number of formats. In an embodiment of the invention, the published text from which the digital image is taken need not have the same resolution as the original image for the image matching to be successful. In addition, in a case where an entire article is desired, a digital image of only a portion of the article can be used to retrieve the matching image for the entire article or even the entire publication page. In such a case, the collected digital image serves as a pointer. Further, if the collected digital image includes more than the desired article, the present invention contemplates determining the desired article based on the publisher's layout and the content of the image.

FIG. 1 is a flow chart illustrating the process of the invention. Initially, a document query snapshot is taken. The user scans or takes a picture of a document or article using a digital camera, scanner, or other suitable device. A digital camera is an electronic device used to capture and store photographs or images electronically instead of using photographic film like conventional cameras. A scanner is a device that analyzes an image (such as a photograph, printed text, or handwriting) or an object (such as an ornament) and converts it to a digital image. Only a fraction of the document needs to be scanned. The snapshot can be as small as a few square inches that covers the area of interest on the page.

In an embodiment of the invention, a PLANon Docupen is used. The Docupen is a compact color handheld scanner that looks like a pen, with 24-bit full-page scanning and memory that can accommodate hundreds of pages. Resolution of 100 to 400 dpi is currently attainable.

Next, an original document search takes place. The query snapshot is used as a "query image" and sent to a search engine with access to one or more databases containing the original images. A search engine is a document retrieval system designed to help find information stored on a computer system, such as on the World Wide Web, inside a corporate or proprietary network, or in a personal computer. The search engine allows one to ask for content meeting specific criteria and retrieves a list of items that match those criteria. This list is commonly sorted with respect to some measure of relevance of the results. Search engines commonly use regularly-updated indexes to operate quickly and efficiently.

"Search engine" most commonly refers to a Web search engine, which searches for information on the public Web. Other kinds of search engines include enterprise search engines, which search on intranets, personal search engines, which search individual personal computers, and mobile search engines. Different selection and relevance criteria may apply in different environments, or for different uses.

Databases searched by the search engine include text in addition to images. In an embodiment of the invention, the camera or scanner is attached to a computing device that provides access to the database to facilitate the original document search. Internet access is not required if the database(s) are locally available or if other access to the database(s) is available (e.g., through a direct connection).

Next, the original retrieval search occurs via a known, suitable image-matching technique, using the query image to retrieve the original high-resolution image document. In an embodiment of the invention, the image document is retrieved using an image-matching technique called "near-duplicate image detection." The search engine returns the most likely document that matches the query image. If more than document is retrieved, a list of documents can be displayed, for example sorted by relevance or by date. In an embodiment of the invention, the document or the list of documents is displayed to the user. If a list is displayed, the user can then select the desired document from its image (e.g., a thumbnail) or from a textual representation (e.g., an excerpt).

After the original document is identified, article retrieval takes place on a suitable computing device. This is necessary when a search for a single article returns and original image of an entire page. In an embodiment of the invention where the page layout (i.e., the geometry of the boxes that border the texts of the articles on the page) is known, if the retrieved page contains more than one article and an image of an entire page is retrieved, the desired article is determined using the overlapping area between a geometry of the article layouts and the snapshot boundary. The article having the greatest overlapping area is selected for retrieval. In this case, the snapshot is used both as a query image and as a pointing device.

Finally, after the article is retrieved, it is rendered on a suitable computing device, which may be the same computing device that retrieved the article. Rendering, as used herein, refers generally to taking an electronic version of a document or article and converting it to a form that can be appreciated by the target audience. In an embodiment of the invention, the target audience includes visually impaired and dyslexic individuals. Rendering can include, for example, zooming, displaying a high-resolution image, or retrieving text and converting it to speech or Braille. Text associated with the desired image can be retrieved and rendered, for example by conversion to speech with a speech synthesizer such as a text-to-speech (TTS) system.

The invention contemplates variations, some of which may improve usage and/or performance of the system. For example, the user may first scan a piece of a cover page to identify a magazine or book before scanning the article or page to be rendered. Such a step can reduce the number of images to be searched and also reduce the number of false positive errors.

Near-Duplicate Image Detection

Figure 2:
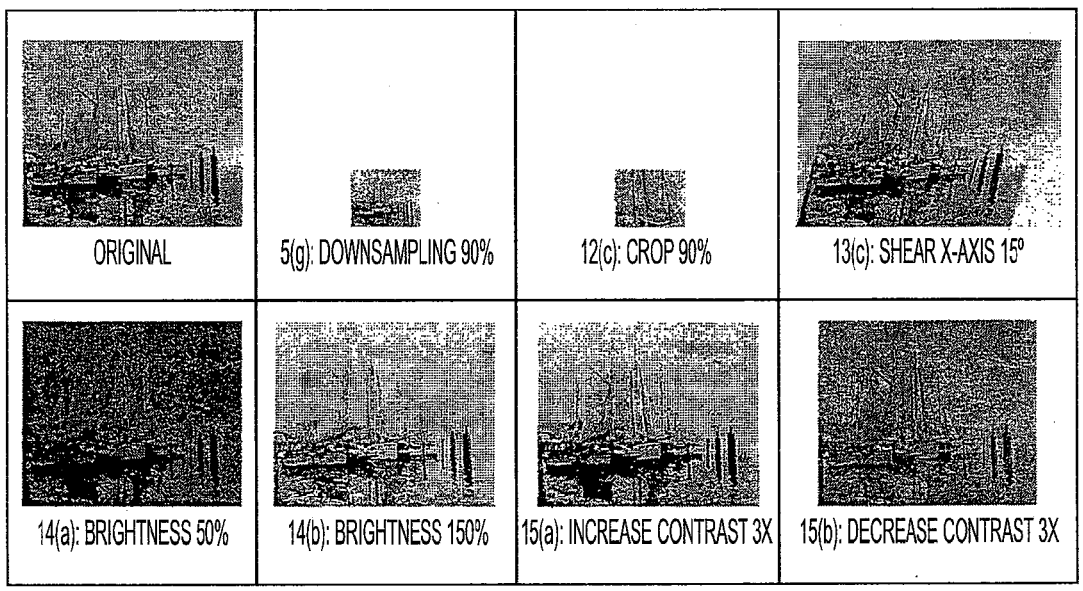
FIG. 2 illustrates examples of near-duplicate images.

Near-duplicate image detection (NDID) is a method for near-duplicate detection and sub-image retrieval. Near-duplicates, as used herein, refers generally to images altered with common transformations such as changing contrast, saturation, scaling, cropping, framing, etc. FIG. 2 illustrates examples of near-duplicate images. NDID builds a representation of images using distinctive local descriptors that give high quality matches even under severe transformations. To cope with the large number of features extracted from the images, NDID employs efficient algorithms for near-neighbor retrieval, such as locality-sensitive hashing, to index the local descriptors. This allows NDID to make approximate similarity queries that only examine a small fraction of the database. By optimizing layout and access to the index data, NDID can efficiently query indices containing large numbers of documents and achieve near-perfect accuracy.

NDID, instead of using a single feature vector to describe an entire image, identifies and independently indexes a large number of local features, each of which is highly distinctive. This approach selectively identifies local features that match extremely well, rather than seeking loose partial matches between complicated global image features. Unlike traditional image matching techniques, this approach is highly resistant to occlusions and cropping, both of which can destroy a significant fraction of the features. It is the foundation for NDID, which differs in the following respects. First, it uses scale- and rotation-invariant interest point detectors, more distinctive local descriptors, and performs geometric verification on the matched features. Second, instead of an ad hoc approximate similarity search, it employs locality-sensitive hashing, an algorithm with provable performance bounds. Third, it employs offline indices that are optimized for disk access and search for all of the query local descriptors in a single pass. This enables NDID systems to query large image collections in interactive time.

Distinctive interest points are commonly employed in a number of real-world applications such as object recognition and image retrieval because they can be computed efficiently, are resistant to partial occlusion, and are relatively insensitive to changes in viewpoint. There are three considerations to using interest points in these applications. First, the interest points should be localized in position and scale. Typically, interest points are placed at local peaks in a scale-space search, and filtered to preserve only those that are likely to remain stable over transformations. Second, the neighborhood surrounding each interest point should be modeled by a local descriptor. Ideally, this description should be distinctive (reliably differentiating one interest point from others), concise, and invariant over expected geometric and photometric transformations. Finally, the matching between local descriptors must be accurate and computationally efficient. For interest point detection, NDID uses Lowe's Difference of Gaussian (DoG) detector. The DoG detector consists of three major stages: (1) scale-space peak selection; (2) interest point localization; (3) orientation assignment. In the first stage, potential interest points are identified by scanning the image over location and scale. This is implemented efficiently by constructing a Gaussian pyramid and searching for local peaks, termed keypoints, in a series of DoG images. In the second stage, candidate keypoints are localized to sub-pixel and sub-scale accuracy, and eliminated if found to be unstable. The third stage identifies the dominant orientations for each keypoint based on its local image patch. The assigned orientation(s), scale, and location for each keypoint enables NDID to construct a canonical view for the keypoint that is invariant to similarity transforms.

Figure 3:
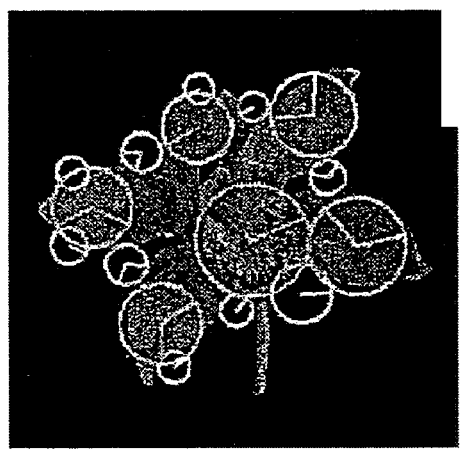
FIG. 3 shows near-duplicate image detection keypoints found in two images of a plant.
Figure 3:
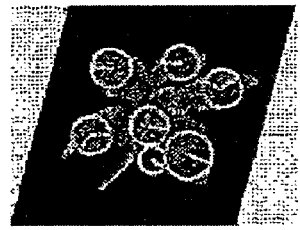

FIG. 3 shows the keypoints found in two images of a plant. One image is a rotated, scaled and sheared version of the other found in: (a) the original image and (b) a rotated, scaled, and sheared image. The keypoints located in the pair of images are shown as white circles, with lines denoting dominant orientations and radius denoting scale. The keypoints are found at the same locations in each image, enabling NDID to accurately match the transformed image to the original. The size and orientation of the keypoints reflects how the image was scaled, rotated and sheared. For illustration purposes, keypoints with a very small scale are not shown. The size and orientation of the keypoints are consistent with the applied transform. Although some of the smaller keypoints from FIG. 3(a) are not detected in FIG. 3(b), our system can still reliably match the larger keypoints.

For interest point representation, NDID uses PCA-SIFT [II]. Given the location, size, and orientation of a keypoint, PCA-SIFT extracts a 41×41 pixel patch at the given scale and rotates it to a canonical orientation. The extracted patch covers an area in the original image proportional to the size of the keypoint. PCA-SIFT then generates a compact feature vector by computing the local gradient image of the patch, normalizes it, and projects it onto a pre-computed eigenspace. As described in [II], this eigenspace is generated once (off-line) from a large number of keypoints extracted from images of natural scenes, and is not specific to a specific image collection. The top 36 components of the projected vector are used as the local descriptor.

The use of local descriptors has several characteristics that are ideal for solving the near-duplicate image detection problem. First, the interest points are scale and rotation invariant. This allows NDID to detect and match the same set of interest points even after images have been arbitrarily rotated or scaled. This approach is also robust to deformations such as Gaussian blurring, median filtering, and the addition or removal of noise, which can degrade or destroy the high frequency content of the original image. This is because a subset of interest points in the original image will continue to match those interest points that encode lower frequency content in the transformed image (corresponding to larger image areas). Second, the descriptors are robust to image deformations such as affine warp, changes in brightness and contrast, etc. Furthermore, PCA-SIFT ignores color and operates on gray-scale images, making the algorithm robust to transforms that manipulate the color content of the image, such as saturation and colorization.

Finally, because NDID uses local descriptors, it can find matches even if there is significant occlusion or cropping in the images. The system can require, for example, as few as five interest points (out of hundreds) to match between two images in terms of descriptor similarity and geometric constraints. Despite the small number of interest points needed to match, NDID maintains a low false positive rate because the local descriptors are highly distinctive and the geometric constraints further discard many false positives. In practice, the smallest sub-image NDID can reliably match between two images is approximately 100×100 pixels. This technique is also well suited to approximate similarity search algorithms, where one achieves a much faster query time at the cost of missed matches. Although recall may suffer at the keypoint level, the overall recall of the system can continue to be very high because so few keypoint matches are needed. Because of the large number of keypoints present in each image, it is cost prohibitive to do a linear search through the database for each query. Therefore, NDID employs an approximate similarity search that is well suited for high dimensional data.

Locality-sensitive hashing (LSH) is an approximate similarity search technique that works efficiently even for high-dimensional data. Traditional data structures for similarity search suffer from the curse of dimensionality, in that they scale poorly for data with dimensions greater than 20, where they perform no better than an exhaustive linear search through the entire database. Given that NDID data consists of many, high-dimensional (36-dimensional) feature vectors, LSH is an appropriate indexing scheme.

A popular algorithm for LSH conceptually transforms each point p into a binary vector by concatenating the unary representation of each (discretized) coordinate of p. The resulting bit string is a point in a high-dimensional Hamming space, where L1 distances between points in the original space are preserved. Hash functions that simply select a subset of the bits that satisfy the desired locality-sensitive properties.

Locality-sensitive hashing was originally designed to work efficiently in memory, where random access is fast. The key difference between NDID and other systems that use LSH for other applications is that NDID queries occur in batches of hundreds or thousands (corresponding to all of the keypoints in the query image). NDID extracts the keypoints from the query image, and searches on the entire set of keypoints to determine if any of them match the keypoints in the database. Because disk seek times are the bottleneck, NDID relies on organizing the batch queries so as to minimize the motion of the disk heads by pre-computing all of the hash bins needed to access, sort, and access the queries in sequential order. Reducing the disk head motion in this manner translates to a dramatic improvement in effective seek time—cutting it to approximately 1 ms per seek.

Implementation details of NDID follow. The algorithm consists of two stages. First, in the index construction phase, the image collection is processed and the extracted keypoints are indexed. Then, in the database query phase, the user can issue queries to find near-duplicates or to perform sub-image retrieval. These are summarized below.

Index construction: Given the collection of images to be indexed, NDID first uses the SIFT DoG detector to locate all of the interest points. It then uses PCA-SIFT to build local descriptors using a small image patch centered around each interest point. Disk-based data structures are created, which are laid sequentially on disk. The data structures store a list of file names (FT), a list of keypoints from all the images (KT), and the locality-sensitive hash table of pointers to the keypoints (HTs). The exemplary data structures illustrated in FIG. 2 can be constructed as follows. First, a file name table (FT) is created using a list of fixed-sized records on disk. Each record is 256 bytes in length, where the first byte denotes the length of the file name and the rest are used to store the string. Implicitly, the ID of each file is its index location in the name table.

The following table is an exemplary file name table (FT) illustrating the format of the disk-based data structures.

| ID | Byte 1<br>Len | Byte 2 | Byte 256<br>File name |
|---|---|---|---|
| 1 | xxx | | File 1 |
| 2 | xxx | | File 2 |
| ... | ... | ... | ... |

The following table is an exemplary keypoint table (KT) illustrating the format of the disk-based data structures.

| ID | Bytes 1-4<br>File ID | Bytes 5-8<br>X | Bytes 9-12<br>Y | Bytes 13-16<br>Size | Bytes 17-20<br>Orien. | Bytes 21-92<br>Local Descr. |
|---|---|---|---|---|---|---|
| 1 | Aaa | | | | | |
| 2 | Bbb | | | | | |
| ... | ... | ... | ... | ... | ... | ... |

The following table is an exemplary hash table (HT) illustrating the format of the disk-based data structures.

| Bucket ID | Bytes 1-4<br>Keypoint 1<br>Key ID | Bytes 5-8<br>Keypoint 1<br>Hash Val | Bytes 9-12<br>Keypoint 2<br>Key ID | Bytes 13-16<br>Keypoint 2<br>Hash Val | | |
|---|---|---|---|---|---|---|
| 1 | | | | | | |
| 2 | | | | | | |
| ... | ... | ... | ... | ... | ... | ... |

NDID also creates the keypoint table (KT) using fixed-sized records. Each record stores one keypoint and consists of a file ID (where the keypoint came from), its x and y location, orientation, scale, and its local descriptor. In total, each record is 92 bytes in length. Assuming that there are a thousand keypoints per image, it takes approximately 90 MB to store the keypoints from one thousand images. Whenever possible, NDID optimizes disk read access. For instance, given a list of keypoints that need to be read from disk, NDID first sorts the list by keypoint ID, thus ordering the disk reads to be efficient, and thereby reducing the average seek time.

Finally, NDID creates the locality-sensitive hash tables (HTs). The LSH algorithm builds l independent hash tables, each with its own hash function. The layout of a single hash table is described below. All of the independent hash tables are concatenated and stored sequentially on disk. The hash tables are of fixed size, so the number of stored keypoints must be determined before the hash tables are created. Each hash table consists of B buckets, where each bucket can store up to m keypoints. With a utilization value of $\alpha$, $B=n/(\alpha m)$ buckets are needed to store n keypoints. A higher a will lead to better space utilization, with an increased risk that some keypoints will not be indexed due to full buckets. A smaller bucket size m will lead to faster search times, but also a higher risk of dropped keypoints.

Once the index is created on disk, NDID can issue queries on new images using a parallel set of operations. First, interest points are located in the query image and local descriptors are built, as described above. Next, the bucket ID's of each keypoint are calculated using the locality hash functions without accessing the disk. The bucket ID's are sorted and the buckets are read in order, which corresponds to a linear seek on disk. The keypoints within a bucket are read and it is confirmed that the checksum hash values match. All of the candidate keypoints are stored in a list sorted by keypoint ID.

Finally, the keypoint data (location, orientation, size, and descriptor) is read from the keypoint table (KT) to generate a list of candidate matches for the query keypoints. Because LSH only returns approximate matches with respect to the L1 (Manhattan) norm, NDID checks both for false positives and for points outside the threshold distance under the L2 (Euclidean) norm. False matches are discarded by checking that the distance between the local descriptors of the query keypoint and the candidate keypoints is within the threshold distance under L2.

At this point, NDID looks up the file ID (in FT) corresponding to matched keypoints and separates them according to file ID. The greater the number of matches found per file, the more likely it is that the image is a near-duplicate. However, it is still possible that there are false positives at the keypoint match phase. In other words, although some keypoints are within the threshold distance, they belong to patches of images that are not near-duplicates. NDID performs affine geometric verification using RANSAC to eliminate such outliers. The affine transformation between two images can be derived using three pairs of matched keypoints. RANSAC verifies whether a majority of the other matched keypoints support this transform and discards any outliers. The remaining pairs of matched keypoints correspond to the target image under an affine warp from the query image. The affine transformation includes rotation, scale, and shearing along the axes. The remaining set of images is discarded if fewer than e matches are found, where e is an adjustable parameter that controls the recall-precision of the system.

The present invention contemplates rendering of the retrieved image and/or text in a variety of formats and on a variety of devices. For example, the image may be rendered as a high-resolution image for display, perhaps with increased text size. The image may be retrieved as text to be output in forms such as Braille or audio, or translated to a different language. The rendered image may be output to a wide variety of devices, including computer monitors, personal digital assistants (PDAs), cell phones, televisions, stereos, and dedicated equipment. The rendered image may be output in more than one format at the same time. For example, the output may be displayed as translated text and played as audio.

The invention does not require that the captured image include all of the text sought, because the image search will identify the original image corresponding to the entire article or document from a portion of the image that has been scanned. It is from this original that the text of interest can be extracted. The present invention contemplates retrieval regardless of whether the content of the snapshot/query includes graphics, images, text or combinations thereof. Graphics and images are part of the article layout and, as such, can be used to identify the article. Further, the retrieval image-based retrieval of the present invention can be applied to a wide variety of printed material, including display signs and even 3D panoramic views.

The invention claimed is:

1. A method for image-based retrieval of an image or text, comprising:
   capturing at least a portion of a cover page and a digital image, the digital image comprising text, and the cover page identifying a publication source of the digital image;
   matching, without optical character recognition, the digital image against digitally-stored documents;
   retrieving one or more of the digitally-stored documents that match the digital image, the digitally stored documents comprising a composite of images in a defined layout; and
   retrieving from the composite of images an article corresponding to the captured digital image using a greatest overlapping area between a geometry of the defined layout and a boundary of the digital image.

2. The method of claim 1, wherein the image documents are retrieved using near-duplicate image detection, wherein near-duplicate image detection comprises indexing a plurality of distinctive local descriptors.

3. The method of claim 1, further comprising rendering the retrieved image.

4. The method of claim 3, wherein rendering includes converting the retrieved image for visual display.

5. The method of claim 3, wherein rendering includes converting the retrieved image for audio output.

6. The method of claim 5, wherein converting the retrieved image for audio output includes converting the image to text and converting the text to speech.

7. The method of claim 3, wherein rendering includes converting the retrieved image for Braille output.

8. The method of claim 7, wherein converting the retrieved image for Braille output includes converting the image to text.

9. The method of claim 1, wherein the digital image is captured using a digital camera or a scanner.

10. A method for image-based retrieval and rendering, the method comprising:
    capturing at least a portion of a cover page and a digital image, the digital image comprising text, and the cover page identifying a publication source of the digital image;
    matching, without optical character recognition, the digital image against digitally-stored documents;
    retrieving a digitally-stored document that matches the digital image, the digitally stored document comprising a composite of images in a defined layout;
    retrieving from the composite of images an article corresponding to the captured digital image using a greatest overlapping area between a geometry of the defined layout and a boundary of the digital image; and
    rendering the retrieved document.

11. The method of claim 10, wherein rendering includes converting the retrieved image for visual display.

12. The method of claim 10, wherein rendering includes converting the retrieved image for audio output.

13. The method of claim 12, wherein converting the retrieved image for audio output includes converting the image to text and converting the text to speech.

14. The method of claim 10, wherein rendering includes converting the retrieved image for Braille output.

15. The method of claim 14, wherein converting the retrieved image for Braille output includes converting the image to text.

16. The method of claim 10, wherein the image documents are retrieved using near-duplicate image detection.

17. The method of claim 10, wherein the digital image is captured using a digital camera or a scanner.

18. A system for image-based retrieval and rendering, comprising:
    an image capturing device configured to capture at least a portion of a cover page and a digital image comprising text, the cover page identifying a publication source of the text of the digital image;
    a device configured to send the digital image to a search engine for retrieving one or more image documents that match the digital image;
    a device configured to process the digital image to match the digital image, without optical character recognition, against digitally-stored documents, the digitally stored documents comprising a composite of images in a defined layout; and
    a device configured to retrieve from the composite of images an article corresponding to the captured digital image using a greatest overlapping area between a geometry of the defined layout and a boundary of the digital image.

19. The system of claim 18, wherein the image capturing device includes a digital camera or a scanner.

20. The system of claim 18, wherein one or more computers process the digital image to match it against digitally-stored documents, retrieve the digitally stored document that matches the digital image, and render the selected retrieved image.

21. The system of claim 18, wherein the image capture device is a digital camera or a scanner.

22. The system of claim 21, further comprising a device for rendering the one or more images that match the digital image.

23. The method of claim 2, wherein near-duplicate image detection further comprises using Lowe's Difference of Gaussian detector.

24. The method of claim 23, further comprising constructing a Gaussian pyramid and searching for keypoints.

* * * * *